(12) United States Patent
Becker

(10) Patent No.: US 8,643,721 B2
(45) Date of Patent: Feb. 4, 2014

(54) METHOD AND DEVICE FOR TRAFFIC SIGN RECOGNITION

(75) Inventor: Lars-Peter Becker, Berlin (DE)

(73) Assignee: Hella KGaA Hueck & Co., Lippstandt (DE)

( * ) Notice: Subject to any disclaimer, the term of this patent is extended or adjusted under 35 U.S.C. 154(b) by 895 days.

(21) Appl. No.: 12/670,285

(22) PCT Filed: Jul. 17, 2008

(86) PCT No.: PCT/EP2008/059409
§ 371 (c)(1),
(2), (4) Date: Jun. 24, 2010

(87) PCT Pub. No.: WO2009/013223
PCT Pub. Date: Jan. 29, 2009

(65) Prior Publication Data
US 2010/0283855 A1    Nov. 11, 2010

(30) Foreign Application Priority Data

Jul. 24, 2007   (DE) .......................... 10 2007 034 505

(51) Int. Cl.
*H04N 7/18*     (2006.01)
*G06K 9/00*     (2006.01)
*G06K 9/62*     (2006.01)

(52) U.S. Cl.
USPC ............................ 348/148; 382/181; 382/224

(58) Field of Classification Search
USPC .................................. 348/148; 382/181, 224
See application file for complete search history.

(56) References Cited

U.S. PATENT DOCUMENTS

| 6,801,638 | B1 * | 10/2004 | Janssen et al. | 382/104 |
| 7,433,889 | B1 * | 10/2008 | Barton | 1/1 |
| 2004/0010352 | A1 * | 1/2004 | Stromme | 701/1 |
| 2005/0273212 | A1 * | 12/2005 | Hougen | 701/1 |
| 2007/0124157 | A1 * | 5/2007 | Laumeyer et al. | 705/1 |
| 2007/0131851 | A1 * | 6/2007 | Holtz | 250/225 |
| 2007/0154067 | A1 * | 7/2007 | Laumeyer et al. | 382/103 |
| 2007/0171431 | A1 * | 7/2007 | Laflamme | 356/602 |

(Continued)

FOREIGN PATENT DOCUMENTS

| DE | 197 23 293 A1 | 12/1998 |
| DE | 199 38 256 A1 | 2/2001 |

(Continued)

OTHER PUBLICATIONS

Unknown, "The Road Sign Recognition System—RS2", Internet citation from URL: http://euler.fd.cvut.cz/research/rs2/rs2algorithm.html, accessed on Apr. 11, 2000 (XP-002135353).

*Primary Examiner* — Joseph Avellino
*Assistant Examiner* — James Conaway
(74) *Attorney, Agent, or Firm* — Young Basile Hanlon & MacFarlane P.C.

(57) ABSTRACT

In a method and a device for traffic sign recognition, at least one significant feature for a traffic sign is determined which is standardized for a region. The region that corresponds to the determined feature is determined. At least one classification feature and/or at least one classification method is defined depending on the determined region for the recognition of the traffic sign and/or at least one further traffic sign. The recognition of the traffic sign and/or the at least one further traffic sign is performed by using the defined classification feature and/or the defined classification method.

17 Claims, 3 Drawing Sheets

(56) References Cited

U.S. PATENT DOCUMENTS

2009/0285445 A1* 11/2009 Vasa ............................ 382/100
2010/0232656 A1* 9/2010 Ryu ............................. 382/118
2011/0093350 A1* 4/2011 Laumeyer et al. ......... 705/14.73
2012/0002053 A1* 1/2012 Stein et al. .................... 348/148

FOREIGN PATENT DOCUMENTS

| DE | 10 2007 002 562 A1 | 7/2008 |
|---|---|---|
| EP | 0 553 402 A1 | 8/1993 |
| JP | 59-100978 A | 6/1984 |
| WO | 03/040875 A2 | 5/2003 |

* cited by examiner

METHOD AND DEVICE FOR TRAFFIC SIGN RECOGNITION

FIELD OF THE INVENTION

The invention relates to a method and a device for traffic sign recognition, in which the recognition of a traffic sign is performed by using a classification feature and/or a classification method.

DESCRIPTION OF THE RELATED ART

The features and characteristics of known traffic signs in different countries are very different despite the standards established by the Vienna Convention. Therefore, also country-specific classification features or country-specific classification methods should be used for the classification of traffic signs in order to obtain a high recognition quality. In particular, not all special characteristics of traffic signs existing in the countries of the European Union can be sufficiently taken into account when using one single detection and classification strategy. Individual traffic signs in particular differ from one another with respect to left-hand traffic and right-hand traffic, such as "no passing" signs. In countries outside the European Union, further characteristics as well as other types of traffic signs are possible and common.

BRIEF SUMMARY

It is an object of the invention to specify a method and a device by means of which traffic signs can be reliably recognized, even in cross-border traffic.

By defining a classification feature and/or at least one classification method depending on determined recognition qualities or a determined region and by using this classification feature and/or this classification method for recognizing a traffic sign, specific classification features and methods can be used for this region. As a result, recognition quality is increased and the expense is reduced as compared to when classification features and/or classification methods of several regions are taken into account. In particular, a minimization of the calculating time required for the traffic sign recognition and a reduction of the memory requirements necessary for implementing a classification method for the recognition of a traffic sign can be achieved. When using digital signal processors, in particular the memory requirements in the cache memory of the digital signal processor can be reduced if only classification features and classification methods are loaded that are relevant for the region that is determined or defined on the basis of the determined recognition qualities or the determined significant feature.

In particular, it is useful if for different regions, in particular for different countries, different databases and/or different data records are used in which the relevant classification features and/or program data for implementing suitable classification methods are stored. Based on the defined region, then the data record or the database is used for the traffic sign recognition. As a result thereof, a high recognition quality at a low processing expense is achieved.

In another development of the invention, one significant feature is determined that is significant for several traffic signs standardized for this region. Alternatively or additionally, one significant feature can be determined for each of several traffic signs standardized for this region, the traffic signs preferably indicating different legal provisions.

Further, for at least two traffic signs at least one significant feature each for a respective traffic sign can be determined. The region is then determined with the aid of the determined features.

As a significant feature, in particular the size of the traffic sign, the font type, symbol characteristics (e.g. in the case of danger signs, city limit signs, etc.) and/or the size of signs shown on the traffic sign, at least one color, a reflection property and/or at least one property of the support means for supporting the traffic sign can be used. For example, the color and/or the design of a supporting rod with which the traffic sign is installed at the roadside can be used as a significant feature. Further, overhead gantry signs, traffic light facilities on which traffic signs are mounted and/or road lighting devices on which traffic signs are mounted can be used as a significant feature.

It is also advantageous when, on the basis of available image data of at least one image showing a reproduction of at least a part of the area surrounding a vehicle, at least one traffic sign located in this part of the area is determined. The traffic sign can then be classified with the aid of a classification method for classifying the region. Thus, the traffic sign recognition and the determination of the region can be performed with means that are integrated in a vehicle, in particular a motor vehicle, such as a passenger car, a truck or a motorcycle.

During processing of the available image data, the traffic sign can be detected as an object and can be pre-classified as a traffic sign with the aid of a pre-classification method. In doing so, the object or traffic sign is tracked over several images. For this, for example, a known tracking method can be used.

The region can be one or more countries or states, one or more federal states, one or more cantons and/or one or more other administrative units with at least one traffic sign specifically specified for the administrative unit.

Further, it is advantageous to pre-set a region, and, based on the preset region, to use at least one classification feature specified for the preset region and/or at least one classification method specified for the preset region for the recognition of the traffic sign and/or at least one further traffic sign. Preferably, for the classification and the recognition of the traffic sign, one probability each is determined for several possible traffic signs, the probability indicating to what extent this possible traffic sign actually is the traffic sign that is to be classified.

Further, for each of several images of an image sequence with sequentially recorded images the probability can be determined for several possible traffic signs. Thus, for each possible traffic sign a probability is repeatedly determined. On the basis of the single probabilities determined for each traffic sign for the single images, a total probability can be determined by means of which reliable traffic sign recognition is made possible.

In some embodiments of the invention, steps for determining the region are only implemented when the determined probabilities for a specific traffic sign and/or for several traffic signs—preferably repeatedly—fall below a preset limit value. Further, in these and/or further embodiments of the invention, these steps can be implemented in periods in which no traffic signs are classified. This is in particular the case when available image data do not comprise any reproductions of one or more traffic signs or a pre-classification method and/or an object recognition method cannot determine a traffic sign during processing of the available image data.

Further, for at least two different regions data allocated to a respective region can be stored, wherein only those data are used and/or loaded for the classification of the traffic sign allocated to the determined region. Preferably for each region a data record is stored that is used in a selection or the region is preset for the classification of traffic signs.

Further, for each of at least two regions the probability can be determined as to whether, as a result of the determined features, a region is concerned. Preferably the region with the highest determined probability is preset as the current region.

Further, a traffic sign already classified with a preset first region can again be classified with a further preset second region or, respectively, with the classification features and/or classification methods allocated to these regions. In this connection, it is checked whether the traffic sign is classified as a specific traffic sign with a higher probability given the classification with the further second preset region than given the classification with the first preset region. This repeated classification of the traffic sign is preferably performed with the same available image data, wherein the repeated classification of the traffic sign is preferably performed in a period in which no further traffic signs are to be classified, in particular when no traffic signs are detected during the processing of available image data.

Further, given the recognition of a traffic sign specified for a region, this region can be preset for the classification of further traffic signs. This traffic sign can, for example, be an information board at a border crossing. These information boards differ from one another with respect to different countries, in particular in a country code provided on the information board. In the traffic regulations of the Federal Republic of Germany, such a traffic sign is included as "Information at border crossings" as sign 393.

The region can also be determined on the basis of several traffic signs having a feature that is specific for a certain region in order to increase the recognition quality during the recognition or determination of the region.

BRIEF DESCRIPTION OF THE DRAWINGS

Further features and advantages of the invention result from the following description which in connection with the enclosed Figures explains the invention in more detail with reference to embodiments.

DETAILED DESCRIPTION OF EMBODIMENTS OF THE INVENTION

Figure 1:
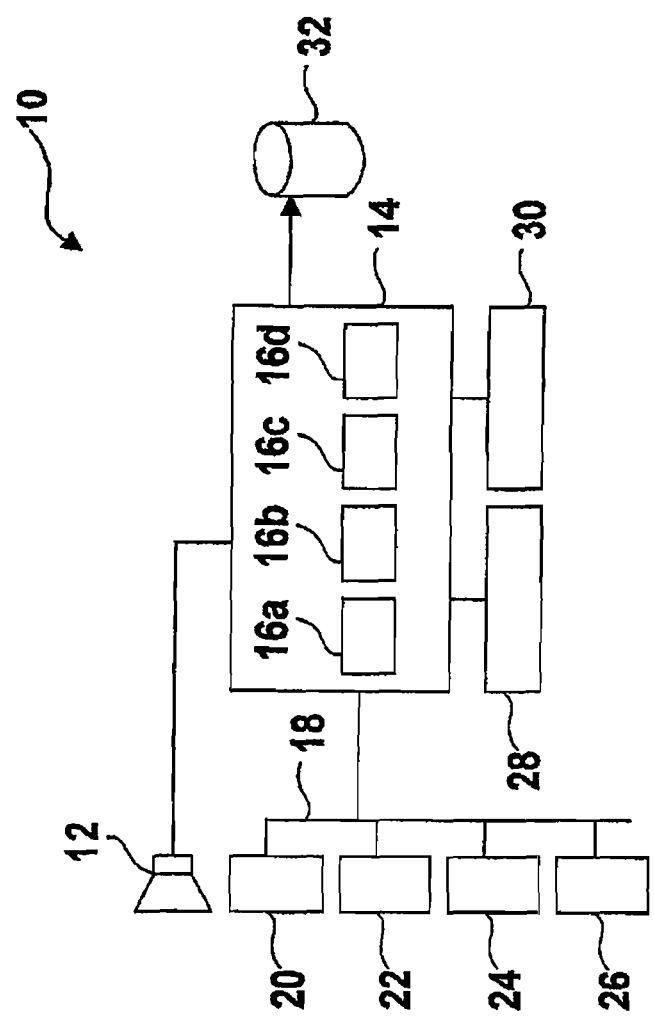
FIG. 1 shows a block diagram of a system for image recording and image evaluation of the area surrounding a motor vehicle.

In FIG. 1, a block diagram of an image recording and evaluation system 10 is illustrated, which is integrated into a motor vehicle, in particular in a passenger car or a truck. The image recording and evaluation system 10 comprises a camera system 12 that records an image sequence showing reproductions of at least a part of an area in front of the vehicle and generates respective image data. These image data are transferred to an image processing unit 14 of the system 10 and are analyzed and processed with the aid of control and processing modules 16a to 16d of the image processing unit 14.

The image processing unit 14 is connected via a vehicle bus 18 of the vehicle with further control and processing units 20 to 26, such as the navigation system, the speed detection and/or regulation system of the vehicle, wherein the image processing unit 14 can exchange data with these further control units 20 to 26 via the vehicle bus 18. The image processing unit 14 is further connected via a suitable data line to a display and alarm unit 28 as well as a speed regulation and/or limit control 30. Further, the image processing unit 14 is connected to a non-volatile storage 32 via a data line. Such a non-volatile storage 32 can, for example, be a hard-disk storage, a flash memory or a further control unit. Further, the non-volatile storage 32 can also be provided by a database system of the motor vehicle. The camera system 12 can comprise a mono camera, several mono cameras, a stereo camera system and/or several stereo camera systems, wherein the individual cameras generate gray scale images or color images. As a vehicle bus 18 conventional known bus systems, such as a LIN bus, a CAN bus and/or a FlexRay bus, can be used. The optical systems of the camera or cameras of the camera system 12 can in particular have different fixed focal lengths or a focal length can be set in particular via a turret-mounted lens system or a zoom lens system.

Via the vehicle bus 18, the image processing unit 14 also communicates with further sensors and receiving units, which in particular can enter into an ad hoc communication with further vehicles and/or with traffic devices, such as traffic light facilities, overhead gantry signs and/or individual traffic signs. Further, via the vehicle bus 18, information on signal states of individual actuators and sensors, in particular on the activation of the travel direction display devices of the vehicle, are transferred.

With the aid of the image sequence recorded by the camera system 12, the traffic signs in the detection area of the camera system 12 are detected and classified by an analysis of the image data with the aid of the image processing unit 14. By the classification of the traffic signs with the aid of a suitable recognition method, each imaged traffic sign is identified as a specific traffic sign. Via the display and alarm unit 28, the reproduction of the traffic sign and/or a symbol corresponding to this traffic sign is displayed.

Additionally or alternatively, text information and/or acoustic information can be output. Further, traffic information, in particular about a speed limit or a minimum speed is transferred to the speed regulation and/or limit control 30, wherein the speed regulation and/or limit control 30 can output a warning signal when the admissible maximum speed is exceeded and/or a minimum speed is fallen below. Alternatively, the speed limits can be used as maximum limit values of a speed regulation and/or speed limit, possibly with an offset.

A further processing and control module 16a to 16d of the image processing unit 14 can determine the current lane of the vehicle on the basis of the reproductions of the image sequence. A further processing module 16a to 16d can allocate those traffic signs that can be allocated unambiguously to one of the determined lanes to this lane only, wherein these traffic signs that are allocated to one lane only can be stored together with the lane information in the non-volatile storage 32. Further, in the non-volatile storage 32, comparison data for a pattern comparison for traffic sign recognition can be stored, in particular country-specific patterns of traffic signs, symbols that can be output on the display unit 28 instead of the reproductions of the recognized traffic signs, as well as texts and/or acoustic information to be output.

A further processing and control module 16a to 16d checks whether a detected traffic sign has at least one feature that is significant for a region. If such a significant feature is determined, the region allocated to this determined feature is determined and defined as a current region. Based on this defined region, for the recognition of the detected traffic sign and/or at least one further detected traffic sign at least one classification feature allocated to this region and/or at least one classification method allocated to this region is determined and used for classification.

Figure 2:
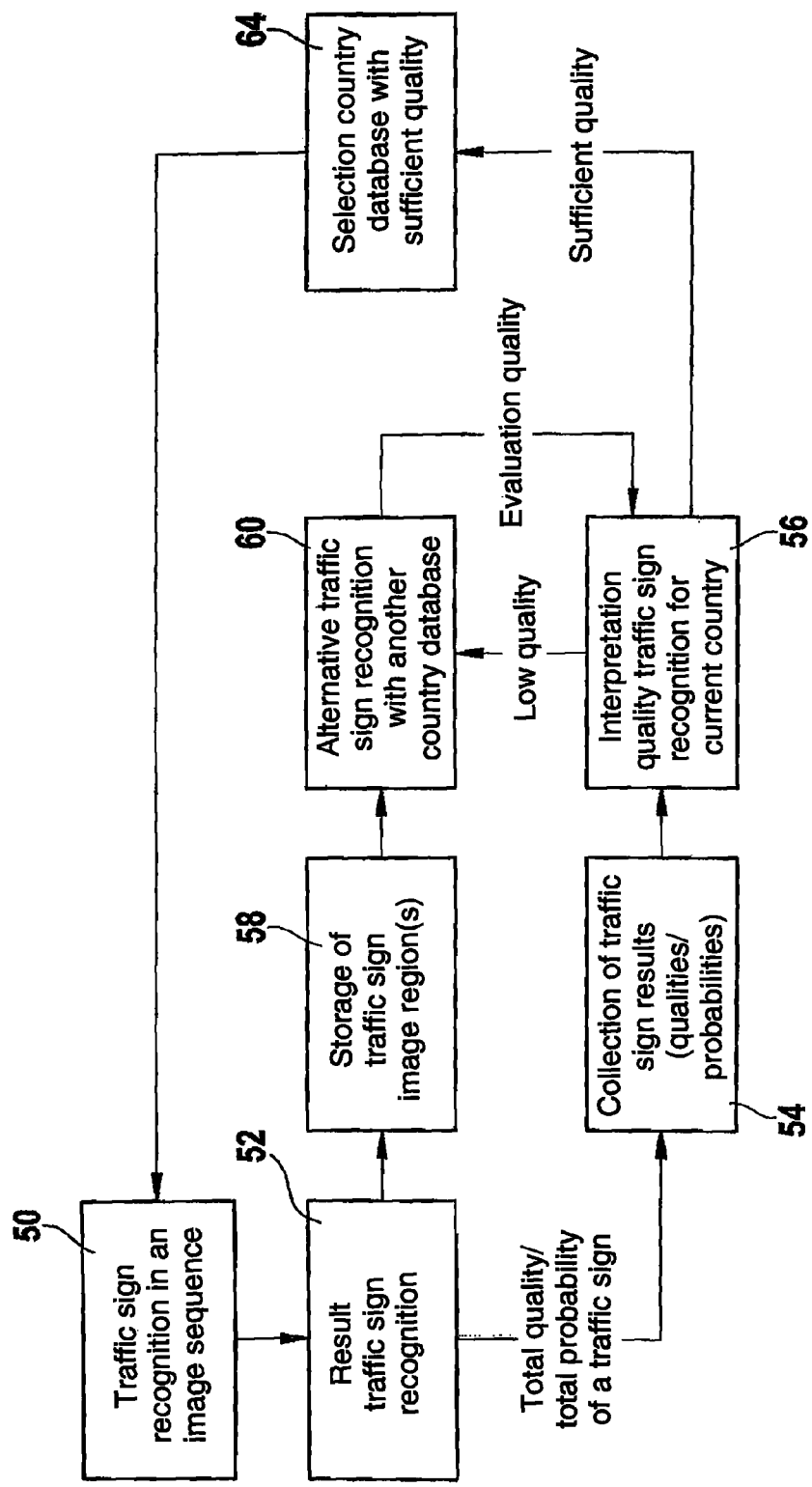
FIG. 2 shows a block diagram with functional blocks for performing country-specific traffic sign recognition according to a first embodiment of the invention.

In FIG. 2, a block diagram with functional blocks for performing a country-specific traffic sign recognition according to a first embodiment of the invention is illustrated. On the basis of the available image data of an image sequence, traffic sign recognition is performed by the functional block 50, wherein for the traffic sign recognition a country-specific traffic sign database with at least partly country-specific classification features and/or at least partly country-specific classification methods or program data for providing these classification methods are used. The country-specific database preferably comprises classification methods and classification features for the classification of all standardized traffic signs that are relevant for at least one specific vehicle and can be found in a preset country. Preferably, one country is preset. Depending on this preset country, the country-specific traffic sign database allocated to this country is loaded and used for traffic sign recognition.

By the functional block 52, the result of the traffic sign recognition is determined, and the total quality or total probability of a recognized traffic sign determined over several individual images of the image sequence is transferred as a result to the functional block 54, which collects and stores the results of the qualities or probabilities of recognized traffic signs. The functional block 56 checks whether, on the basis of the collected qualities and probabilities of several successively recognized traffic signs with a preset country-specific traffic sign database in which specific classification features and/or classification methods specified for this country are stored, a sufficient quality is given or not.

In addition, the image regions of the images of the image sequence that are used by the functional block 50 for traffic sign recognition are stored by the functional block 58 so that they are available for further traffic sign recognitions with alternative country-specific traffic sign databases. If the functional block 56 determines that the traffic sign recognition has a low quality, the traffic sign recognition is repeatedly performed with a further alternative country-specific traffic sign database by the functional block 60 with the aid of the image regions with detected traffic signs stored by the functional block 58. The qualities and probabilities determined hereby are transferred to the functional block 56, by means of which the probabilities and qualities determined with the aid of the further alternative country-specific traffic sign database are interpreted. If again only a low recognition quality is determined, this procedure is repeated with further country-specific traffic sign databases until it is determined by the functional block 56 that the result of the traffic sign recognition has a sufficient quality. Then the functional block 64 presets for further traffic sign recognitions the country-specific traffic sign database, for which at least a sufficient and/or the best quality has been determined in the traffic sign recognition. If no sufficient quality is achieved with any available country-specific traffic sign database, a corresponding error message can be output and/or the vehicle driver is requested via a corresponding dialogue to enter a country code and/or to enter the country where the vehicle currently is.

Alternatively, after the repeated traffic sign recognition with a further country-specific traffic sign database by the functional block 60, there can be a branching to the functional block 54 in which the determined qualities and probabilities are stored, wherein then there is a branching from the functional block 54 further to the functional block 56. In the embodiment according to FIG. 1, the repeated traffic sign recognition with a further country-specific traffic sign database by the functional block 60 with the aid of the stored image data takes place in periods in which no qualities and probabilities of detected traffic signs are to be determined, in particular when no traffic signs are detected in recorded images of an image sequence in the block 50.

Figure 3:
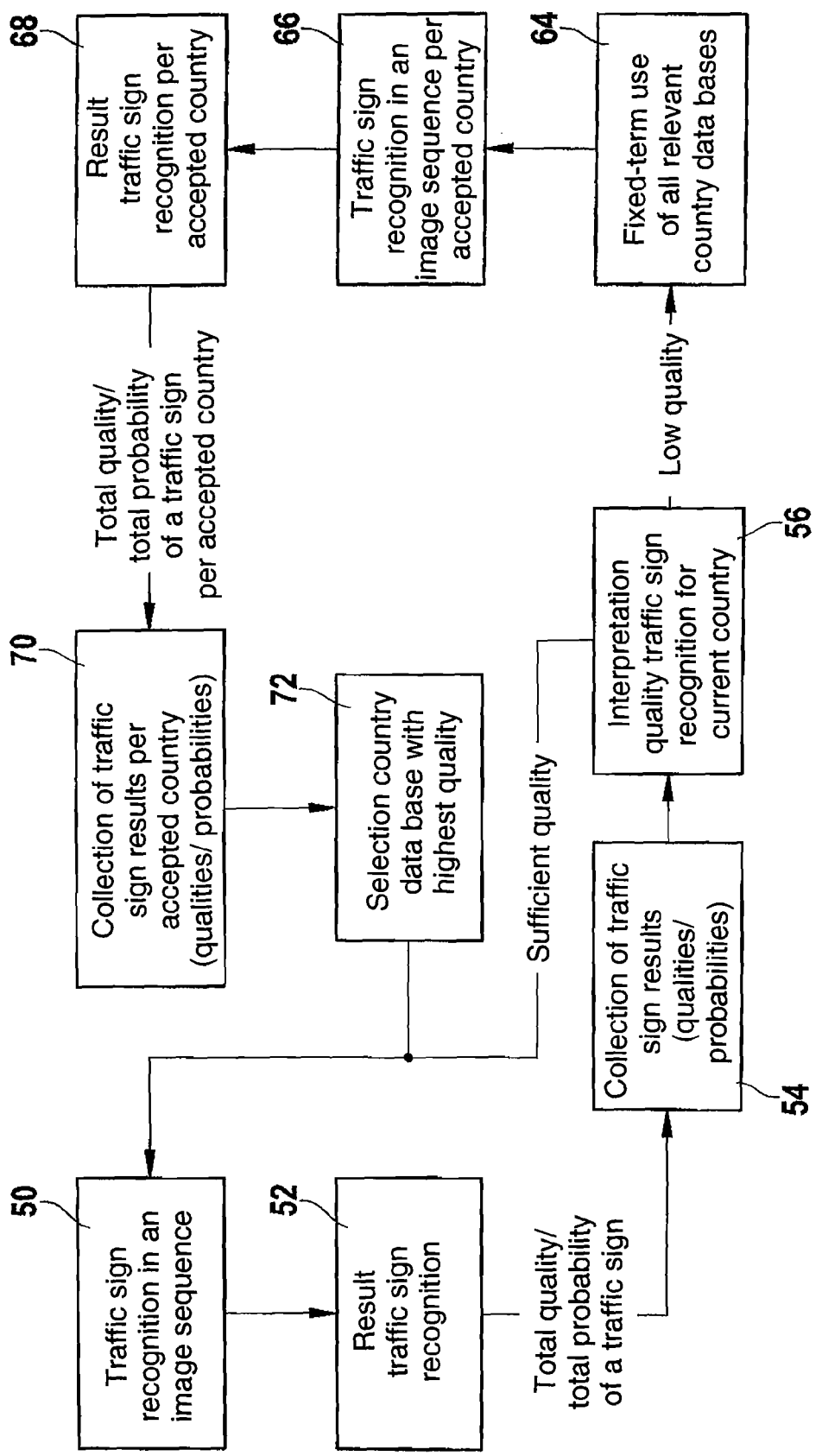
FIG. 3 shows a block diagram with functional blocks for performing country-specific traffic sign recognition according to a second embodiment of the invention.

In FIG. 3, a block diagram with functional blocks for performing country-specific traffic sign recognition similar to the block diagram according to FIG. 2 is illustrated according to a second embodiment of the invention. Identical elements are identified by identical reference signs. In contrast to the block diagram of FIG. 2, the alternative traffic sign recognition in the block diagram of FIG. 3 takes place with a further country-specific traffic sign database in parallel with the traffic sign recognition using a currently preset country-specific traffic sign database. In the same way as in FIG. 1, traffic sign recognition is performed by the functional block 50 on the basis of image data of several images of an image sequence with the aid of a preset country-specific traffic sign database. By the functional block 52, the total quality or total probability of the traffic sign recognition for a traffic sign is determined as a result of the traffic sign recognition and is transferred to the functional block 54, which collects and stores the qualities and probabilities of traffic sign recognitions. Thereafter, the determined total probability or recognition quality for a certain number of traffic signs for the preset country is interpreted by the functional block 56, in particular compared to a probability limit value.

If the functional block 56 determines that a sufficient quality of the traffic sign recognition is given, a branching to the functional block 50 takes place so that the functional block 50 performs further traffic sign recognitions with the currently preset country-specific traffic sign database. If, however, the functional block 56 determines that the traffic sign has been recognized with a low quality, further country-specific traffic sign databases are used for the traffic sign recognition with the same image data by means of the functional block 64. These image data at least comprise the image areas in which traffic signs have been detected, preferably with the aid of a pre-classification, and which have already been used as a basis for traffic sign recognition by the functional block 50.

By means of the functional block 66, and starting out from these image data, a traffic sign recognition is performed preferably for each country for which a country-specific traffic sign database is available, and by means of the functional block 68 the total quality or the total probability for at least one traffic sign is determined for each country as a result of the traffic sign recognition. The result is then supplied to the functional block 70, which collects and stores the results in a manner allocated to the respective country. By means of the functional block 72 the country-specific traffic sign database is determined in which the classification features and/or classification methods are stored with which the highest recognition quality has been determined. This country-specific traffic sign database is then preset in the system for further traffic sign recognition so that this country-specific traffic sign database is used for the further traffic sign recognition by the functional block 50. By determining the country-specific traffic sign database, the region or the country is determined in which the vehicle is situated with the highest determined probability.

By way of the possibilities shown in the embodiments for determining the region or the country in which the vehicle currently is, this information can also be determined without a country or region information from a navigation system and can be used for traffic sign recognition. This is particularly necessary when there is no data exchange between a navigation system of a vehicle and the system for traffic sign recognition, for example when using mobile navigation systems. Further, navigation information is also lacking when the navigation system has failed or the map data for the region in which the vehicle currently is are not available. When crossing a country border, by way of the described procedure it can automatically be switched to the relevant country-specific traffic sign database in which in particular classification features and/or classification methods are stored. At least a part of these classification features and/or classification methods is specifically adapted to the traffic signs of the country or the region. By providing specific country-specific traffic sign databases, the recognition quality can be considerably increased at least for individual countries. Further, only a relatively low processing expense is required since all possible country-specific traffic sign databases do not have to be referred to for every single traffic sign recognition. Preferably, a newly determined region or a newly determined country is verified by the repeated recognition of several traffic signs in order to achieve a statistical hedging of the result of the region recognition or country recognition. In particular, a preset region is only replaced by a new region when a minimum number of localized and processed traffic signs has been determined.

After crossing a country border relevant for a specific traffic sign class, the determined probability of the recognized traffic sign will decrease and, in individual cases, the determined probability will tend to zero. This is, for example, the case when the traffic sign is a "no passing" sign for trucks, and the vehicle passes a country border, wherein in the country of origin there is right-hand traffic and in the new country there is left-hand traffic or vice versa, so that the "no passing" signs differ from one another. However, for example, differences in the font type and/or font size of prohibition signs and mandatory signs for a speed limit also occur, which differences have a considerable influence on the recognition quality of the traffic sign recognition.

By proceeding as described, the automatic recognition of the country or the region in which the vehicle is currently situated takes place. This automatic recognition is based on the quality of the traffic sign recognition, without navigation information having to be referred to. As illustrated in the embodiments, the method for determining the region or the country in which the vehicle is currently situated can be performed continuously or only when the quality of the traffic sign recognition or the traffic sign classification falls below a preset limit value. This limit value is, for example, fallen below when a preset number of classified traffic signs falls below a preset probability value or when a preset number of detected traffic signs cannot be classified on the basis of the country-specific traffic sign database selected by the preset region. Also a country-specific data record or several country-specific data records are considered as a country-specific traffic sign database herein, which data records are provided by a database system and/or are stored in a non-volatile storage of the vehicle.

The invention claimed is:

1. A method for traffic sign recognition, comprising:
   on the basis of available image data of at least one reproduction of a traffic sign, performing a first traffic sign recognition with at least one of a first classification feature specified for a first geographical region or a first classification method specified for the first geographical region to determine a first recognition quality of the first traffic sign recognition, wherein the first recognition quality is a probability indicating to what extent at least one possible traffic sign of the first geographical region is the traffic sign;
   on the basis of the available image data of the at least one reproduction of the traffic sign, performing a second traffic sign recognition with at least one of a second classification feature specified for a second geographical region or a second classification method specified for the second geographical region to determine a second recognition quality of the second traffic sign recognition, wherein the second recognition quality is a probability indicating to what extent at least one possible traffic sign of the second geographical region is the traffic sign;
   using the at least one of the first classification feature specified for the first geographical region or the first classification method specified for the first geographical region to identify the traffic sign as a specific traffic sign when the first recognition quality is greater than the second recognition quality; and
   using the at least one of the second classification feature specified for the second geographical region or the second classification method specified for the second geographical region to identify the traffic sign as a specific traffic sign when the first recognition quality is less than the second recognition quality.

2. The method according to claim 1, characterized in that the second traffic sign recognition is performed responsive to the recognition quality determined with the aid of the first traffic sign recognition falling below a preset recognition quality limit value.

3. The method according to claim 1, characterized in that, on the basis of available image data of at least one image with a reproduction of at least a part of an area surrounding a vehicle, at least one traffic sign present in this area is determined.

4. The method according to claim 3, characterized in that during a processing of the available image data the traffic sign is detected as an object and is pre-classified as a traffic sign with the aid of a pre-classification method, wherein the object is tracked over several images.

5. The method according to claim 1, characterized in that a geographical region comprises at least one country, a federal state, a canton and another administrative unit having at least one traffic sign specifically specified for the administrative unit.

6. The method according to claim 1, characterized in that each time region-allocated data with the at least one classification feature specified for the respective geographical region or each time region-allocated program data for providing at least one classification method specified for the respective geographical region are held available by a data processing unit for the recognition of the traffic sign, wherein at least two different geographical regions are provided.

7. The method according to claim 6, characterized in that at least one of the geographical region-allocated data and the region-allocated program data are stored in a non-volatile storage area of the data processing unit.

8. The method according to claim 6, characterized in that a geographical region is preset, and in that, on the basis of the preset geographical region, at least one of a classification feature specified for the preset geographical region or a classification method specified for the preset geographical region are used for the recognition of the traffic sign, wherein for each of several possible traffic signs a probability is determined that the possible traffic sign is the specific traffic sign.

9. The method according to claim 8, characterized in that for each of several images of an image sequence with sequentially recorded images the probabilities for several possible traffic signs is determined.

10. The method according to claim 8, characterized in that the method steps for determining the geographical region are only implemented when the determined probabilities fall below a preset limit value or in periods in which no traffic signs are classified.

11. The method according to claim 1, characterized in that for at least two different geographical regions, data allocated to the respective geographical region are stored, and in that only those data are loaded for classification of the traffic sign which are allocated to the determined geographical region, wherein preferably for each geographical region a data record is stored which is used in the selection or presetting of this geographical region for the classification of traffic signs.

12. The method according to claim 1, characterized in that for each of at least two geographical regions the probability is determined whether, on the basis of the features determined, this geographical region is concerned, wherein preferably the geographical region with the highest determined probability is preset as the current geographical region.

13. The method according to claim 1, characterized in that a second traffic sign already classified with the first geographical region is classified again with the second geographical region, wherein it is checked whether given the classification with the second geographical region the second traffic sign is classified with a higher probability than given the classification with the first geographical region.

14. The method according to claim 13, characterized in that this repeated classification of the second traffic sign of the second geographical region takes place with the same available image data as the classification with the first geographical region, wherein the repeated classification of the second traffic sign is performed in a period in which no further traffic signs are to be classified, in particular when no traffic signs are detected in the recorded images.

15. The method according to claim 1, characterized in that given the recognition of a traffic sign specified for a geographical region this geographical region is preset for the classification of further traffic signs.

16. The method according to claim 15, characterized in that this traffic sign is an information board at border crossings, wherein the information boards for different geographical regions differ from one another in particular by a country code provided on the information board.

17. A device for traffic sign recognition, comprising:

an image recording system for generating image data of at least one image with a reproduction of at least a part of an area surrounding a vehicle; and a processing unit that processes the image data and determines a traffic sign that is present in the area covered by the reproduction, that, on the basis of the image data of the traffic sign, performs a first traffic sign recognition with at least one of a first classification feature specified for a first geographical region or a first classification method specified for the first geographical region, wherein the processing unit determines a first recognition quality of the first traffic sign recognition, the first recognition quality being a probability indicating to what extent at least one possible traffic sign of the first geographical region is the traffic sign, that, on the basis of the image data of the traffic sign, performs a second traffic sign recognition with at least one of a second classification feature specified for a second geographical region or a second classification method specified for the second geographical region, wherein the processing unit determines a second recognition quality of the second traffic sign recognition, wherein the second recognition quality is a probability indicating to what extent at least one possible traffic sign of the second geographical region is the traffic sign, that uses the at least one of the first classification feature specified for the first geographical region or the first classification method specified for the first geographical region to identify the traffic sign as a specific traffic sign when the first recognition quality is greater than the second recognition quality, and that uses the at least one of the second classification feature specified for the second geographical region or the second classification method specified for the second geographical region to identify the traffic sign as a specific traffic sign when the first recognition quality is less than the second recognition quality.

* * * * *